(12) United States Patent
Hukin

(10) Patent No.: US 7,461,648 B2
(45) Date of Patent: Dec. 9, 2008

(54) ABRASIVE WIRE SAWING

(75) Inventor: David Ainsworth Hukin, Thame (GB)

(73) Assignee: Rec Scanwafer AS, Porsgrunn (NO)

( * ) Notice: Subject to any disclaimer, the term of this patent is extended or adjusted under 35 U.S.C. 154(b) by 0 days.

(21) Appl. No.: 11/579,415

(22) PCT Filed: May 12, 2005

(86) PCT No.: PCT/NO2005/000158

§ 371 (c)(1), (2), (4) Date: Jul. 10, 2007

(87) PCT Pub. No.: WO2005/110654

PCT Pub. Date: Nov. 24, 2005

(65) Prior Publication Data

US 2007/0283944 A1     Dec. 13, 2007

(30) Foreign Application Priority Data

May 18, 2004   (GB) ................................ 0411055.7

(51) Int. Cl.
*B28D 1/08*   (2006.01)

(52) U.S. Cl. .................. 125/16.02; 125/19; 125/21

(58) Field of Classification Search ................ 83/651.1; 125/12, 16.01, 16.02, 19, 21; 451/541, 542, 451/547

See application file for complete search history.

(56) References Cited

U.S. PATENT DOCUMENTS

| | | | |
|---|---|---|---|
| 4,574,769 A * | 3/1986 | Ishikawa ................ | 125/16.01 |
| 5,564,409 A | 10/1996 | Bonzo | |
| 5,616,065 A | 4/1997 | Egglhuber | |
| 5,865,162 A * | 2/1999 | Kambe et al. ............ | 125/16.02 |
| 5,878,737 A | 3/1999 | Hodsden | |
| 6,319,103 B1 * | 11/2001 | Kim ........................... | 451/173 |
| 6,328,027 B1 * | 12/2001 | Persyk et al. ............... | 125/21 |
| 6,408,839 B1 * | 6/2002 | Hauser ..................... | 125/16.02 |
| 6,550,364 B2 * | 4/2003 | Hauser ..................... | 83/651.1 |
| 6,886,550 B2 * | 5/2005 | Hauser ....................... | 125/21 |

(Continued)

FOREIGN PATENT DOCUMENTS

EP   0 798 092 A3   4/1998

(Continued)

Primary Examiner—Timothy V Eley
(74) Attorney, Agent, or Firm—Finnegan, Henderson, Farabow, Garrett & Dunner, L.L.P.

(57) ABSTRACT

Apparatus for forming a multiplicity of thin wafers from at least two similar blocks, the apparatus comprising a supply reel (1) to supply wire, an upper pair (3a, 3b) and a lower pair (3c, 3d) of parallel spaced roller guides and a collection reel (4); a wire from the supply reel passes around successive grooves along the roller guides from near the supply reel to near the collection reel, so to form a four sided continuous web of wires along the length of the roller guides. Part way along the roller guides, the wire is diverted around at least two pulley wheels(5a, 5b) removing the wire from the web after it has passed over a roller guide at a predetermined point, and reintroducing the wire into the web via a subsequent roller guide at a point laterally displaced from the point at which it left the web, so that there is a gap in the web of wire which divides the web into two separate sections, and no cutting action can occur in that gap.

10 Claims, 4 Drawing Sheets

U.S. PATENT DOCUMENTS 6,941,940 B1 * 9/2005 Zavattari et al. ......... 125/16.02

FOREIGN PATENT DOCUMENTS

| EP | 1 097 782 A1 | 5/2001 |
| GB | 2 238 738 A | 6/1991 |
| JP | 01281865 | 11/1989 |
| JP | 09248754 | 9/1997 |
| JP | 09262822 | 10/1997 |
| JP | 09262823 | 10/1997 |
| JP | 09262824 | 10/1997 |
| JP | 2003145407 | 5/2003 |

* cited by examiner

| INGOT | BLOCKS | WAFERS |
|---|---|---|
| 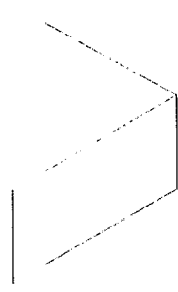 | 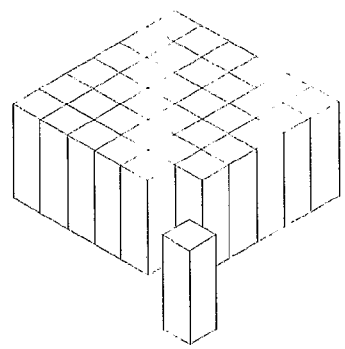 | 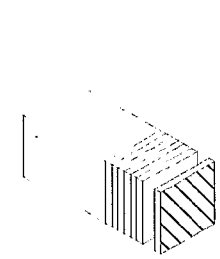 |
| Figure 1a | Figure 1b. | Figure 1c. |
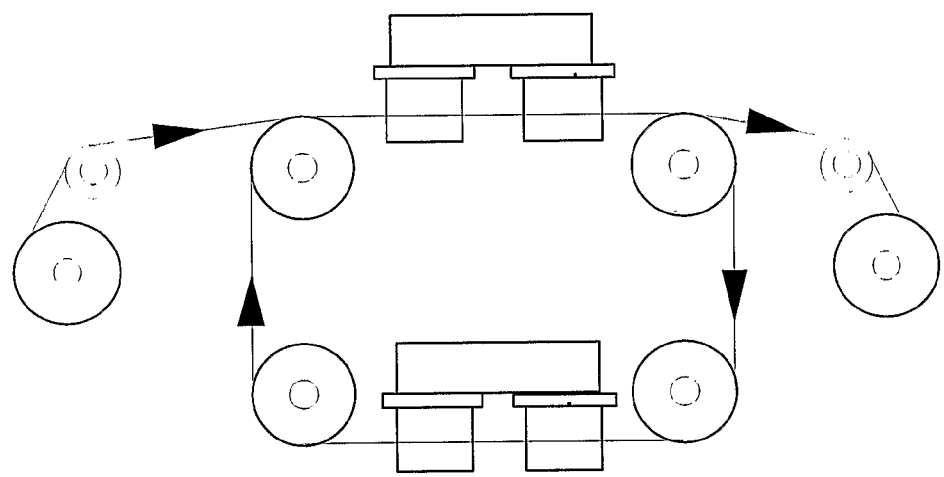
Figure 2. (Prior Art)
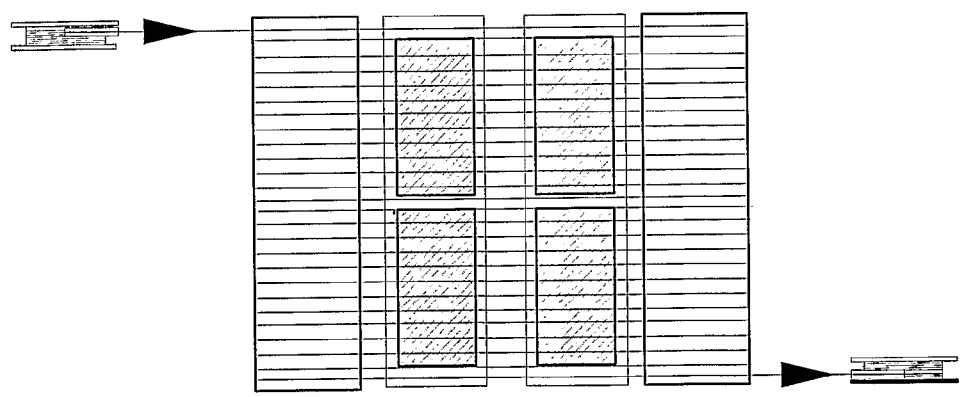
Figure 3. (Prior Art)

ABRASIVE WIRE SAWING

TECHNICAL FIELD OF THE INVENTION

The invention relates to an apparatus for abrasive wire sawing, and to a method of abrasive wire sawing.

BACKGROUND OF THE INVENTION

The technique of multi-blade abrasive wire sawing has been in commercial use for several years. The process is used when it is required to slice thin plates or wafers from bars or blocks of expensive and fragile semiconductor or electro-optic materials.

In the standard process a high tensile steel wire of 150 to 180 microns diameter, which may or may not be coated with a layer of a softer material such as brass, is taken from a supply reel which can contain 200 km. or more of the wire, and passed under tension round a series of four motor driven wire guide rollers before being taken up on a collection reel. The surface of each of the wire guide rollers has a series of closely spaced 'V' shaped grooves machined in it at a pitch separation equal to the thickness of the wire plus the thickness of the required wafer. The lengths of the rollers are such that the wire can pass round them 4-500 times producing a four-sided flat loom or web of wires, where the wire is passing round the rollers at speeds of up to 10 meters per second.

This web may be flooded with a suspension or slurry of a finely divided abrasive powder such as 10 micron silicon carbide powder in a lubricating and cooling medium such as paraffin oil or polyethylene glycol. The material to be sliced is glued or fixed upon a mounting plate in the form of bars and these are then pressed against and slowly lowered through the upper and lower horizontal webs where the fast moving wires together with the abrasive slurry cut a regular series of thin slots through the material producing wafers or plates of accurate thickness and with a fine surface finish.

Two examples of wire sawing apparatus for carrying out such a process are shown in U.S. Pat. Nos. 5,564,409 and 5,616,065.

In the current industrial equipment the web is in the form of one single continuous array of wires and the width of the web is greater than the length of the material which is to be sliced. This arrangement is appropriate and cost effective when the whole of the material is of uniform and acceptable quality for the production of wafers or plates. However, this is not always the case, and in certain circumstances it is important that any region of the material which is not in a condition to produce commercially acceptable wafers, (because of defects in its chemical, physical, or electronic properties), is not sawn because this will convert up to 50% of the material into unrecoverable saw-dust which might otherwise be retained for subsequent recycling.

One example of such a circumstance occurs in the production of multicrystalline silicon wafers for use in photovoltaic (PV) industry. In this process silicon metal is melted and slowly cooled inside a crucible to form an ingot. The ingot is then sawn into a series of tall blocks of uniform square cross-section, which are then sliced into thin wafers in multi-bladed abrasive wire saws.

Because of the technical limitations on the heights of the silicon blocks which may be produced by the casting method, it is industrial practice to fix two or more blocks end to end upon the mounting plate as a single bar in order to fill up the maximum web width on the saw. Whilst this would appear to maximize machine capacity utilisation, it has been found to have considerable drawbacks.

The casting process used commercially to manufacture the silicon ingots results in the production of unacceptable quality material in both the bottom and top few centimeters of the blocks. This material is presently removed using a diamond faced circular or band saw before the blocks are mounted for wafering by gluing them onto a glass or ceramic mounting plate with their adjacent ends slightly separated or sometimes glued to each other.

This arrangement means that the web not only extends beyond both ends of the material to be cut, but also covers the centre section where the blocks butt up to each other or are glued together. It is inevitable that one or more wires in these positions will be cutting incomplete or thin wafers which have a high probability of breaking.

Wafers which break during the actual wire sawing process can have profound effects upon overall sawing yield. Not only can the broken wafers cause jamming of the slots and breakage of the wire, but pieces of broken wafer can be carried onto the surface of the wire roller guides where they cause damage to the precision grooves and result in irregular wafer thicknesses. In the high throughput sawing systems used in the PV industry where two parallel lines of blocks are cut at the same time upon a single web surface, broken wafer fragments can be transported to the down-stream blocks causing catastrophic wire breakages.

The present invention relates to an innovative modification of the process where the single web is separated into two or more webs by the introduction of sets of adjustable angled pulleys into the wire loom.

DISCLOSURE OF THE INVENTION

It is proposed that two or more grooved pulley wheels are introduced into the centre of the web such that the wire is picked up as it emerges from one of the four driven wire roller guides and by-passes the next two subsequent rollers, to be re-introduced to the grooves of the fourth roller at a displacement to that from which it was removed. In effect, this produces a web which consists of two or more contiguous sections of preset width. The grooved pulley wheels may be adjustable for both linear and angular displacement to ensure accurate and stress free web separation.

The invention provides apparatus for forming a multiplicity of thin wafers from at least two similar blocks, the apparatus comprising a supply reel to supply wire, an upper pair of parallel spaced roller guides having a multiplicity of circumferential grooves on their surfaces, a lower pair of parallel spaced roller guides having a similar multiplicity of circumferential grooves on their surfaces and spaced apart from the upper pair of roller guides in a plane generally parallel to and spaced apart from a plane defined by the axes of the upper pair of roller guides, and a collection reel; the arrangement being such that a wire from the supply reel can pass around successive grooves along the roller guides from near the supply reel to near the collection reel, so to form a four sided continuous web of wires along the length of the roller guides and means to drive the wire rapidly from the supply reel to the collection reel, and means to move the blocks through the web of wire between the pairs of roller guides in a direction generally perpendicular to the axes of the roller guides, so that the blocks are cut into wafers by the action of the moving wire, in which part way along the roller guides, the wire is diverted around at least two pulley wheels to remove the wire from the web after it has passed over a roller guide at a predetermined point, and to reintroduce the wire into the web via a subsequent roller guide at a point laterally displaced from the point at which it left the web, so that there is a gap in the web of wire which divides the web into two separate sections, and no cutting action can occur in that gap.

It is preferred that the predetermined point at which the wire is removed from the roller guides is variable in a direction lengthwise of the roller guides.

It is further preferred that there is means to adjust the distance at which the wire is laterally displaced before rejoining the web.

It is further preferred that at least one of the at least two pulley wheels to remove the wire from the web is an idler wheel.

It is further preferred that the pulley wheels to remove the wire from the web are located mid way along the length of the rollers.

It is further preferred that the width of each separate section of the web is smaller than the block to be sawn, so to leave an uncut supporting abutment at least one end of each block on completion of the sawing action.

The wire may be of high tensile steel, or of high strength long chain organic polymers. In the former case, there is advantageously provision to apply slurry to the blocks.

The invention includes a method of forming a multiplicity of thin wafers from at least two similar blocks, and comprising the steps of passing a wire around two pairs of roller guides having a multiplicity of circumferential grooves on their surfaces and arranged to form upper and lower cutting planes, driving the wire around a four sided continuous web of wire along the length of the roller guides, and moving the blocks through the web of wire in a direction generally perpendicular to the axes of the roller guides, including the additional step of diverting the wire around at least two pulley wheels to remove the wire from the web after it has passed over one roller guide at a predetermined point, and reintroducing the wire to the web via a subsequent roller guide at a point laterally displaced from the point at which it left the web, so that there is a gap in the web of wire which divides the web into two separate sections, and no cutting action occurs in that gap.

BRIEF DESCRIPTION OF THE DRAWINGS

An example of the prior art, and a specific embodiment of the present invention, will now be described by way of illustration with reference to the accompanying drawings, in which:

FIGS. 1a, 1b and 1c show three stages in the production of a multi-crystalline silicon wafer;

FIGS. 2, 3 and 4 are a diagrammatic front elevation, plan and orthogonal view respectively of a prior art apparatus.

DESCRIPTION OF PRIOR ART AND A SPECIFIC EMBODIMENT OF THE INVENTION

Production of thin wafers of semiconductor material is shown generally in FIG. 1. An ingot of silicon (shown in FIG. 1a) is cast in a crucible, and is allowed to cool slowly, to ensure an appropriate crystalline form. The ingot is cut by diamond saws into a series of tall blocks of uniform cross section (as shown in FIG. 1b). The blocks are then sawn into thin wafers using multibladed wire saws (as shown in FIG. 1c). The resultant wafers may be used to produce solar cells for the photovoltaic industry.

Figure 4:
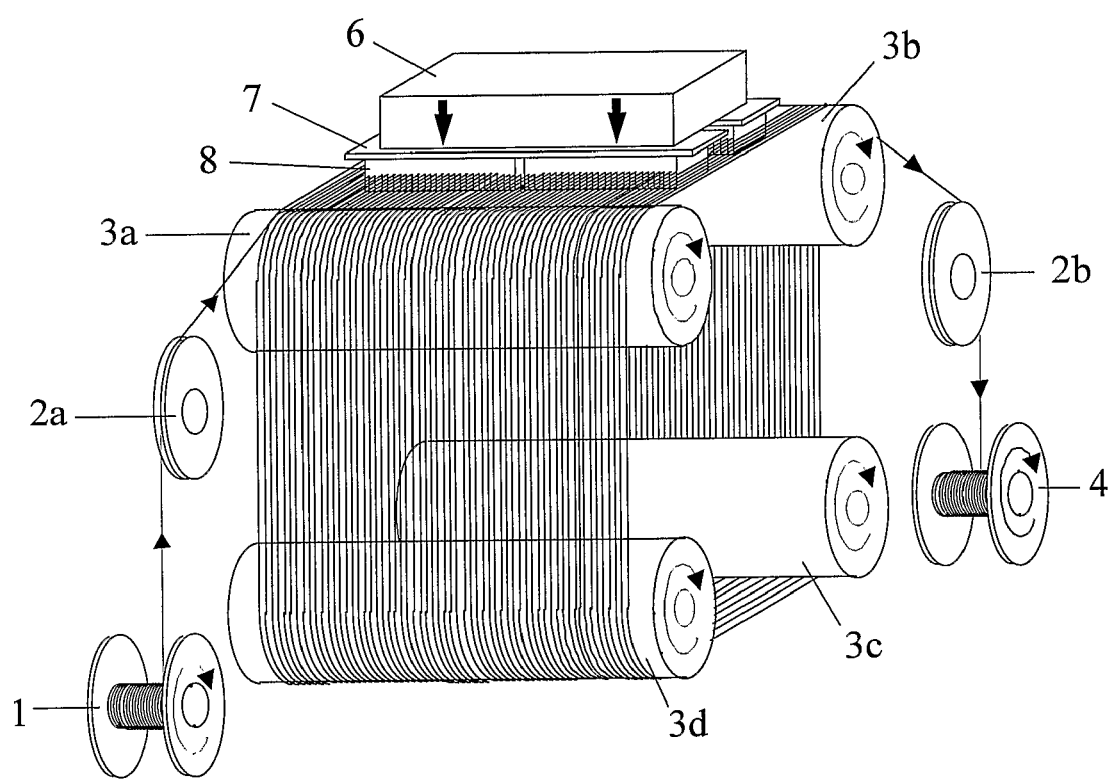

An example of a prior art wire saw is shown in FIGS. 2, 3 and 4. Four motor driven grooved roller guides are arranged in two pairs, one above the other. The two pairs are spaced vertically apart. A cutting wire is wound continuously round the roller guides at a very shallow pitch, to form a web with upper and lower cutting planes. Four blocks of silicon (e.g. four of the blocks shown in FIG. 1b) are disposed to be cut in the upper cutting plane, and four more blocks are arranged to be cut in the lower cutting plane. This arrangement suffers from several disadvantages.

To lessen the effect of some of these disadvantages, there is a need to have all the wires in the web at the same tension when cutting multiple blocks which are shorter than the full web width of a standard machine. There is also a need to support the outermost wafers from each block to reduce or eliminate the chance of their breaking away or falling down.

Figure 5:
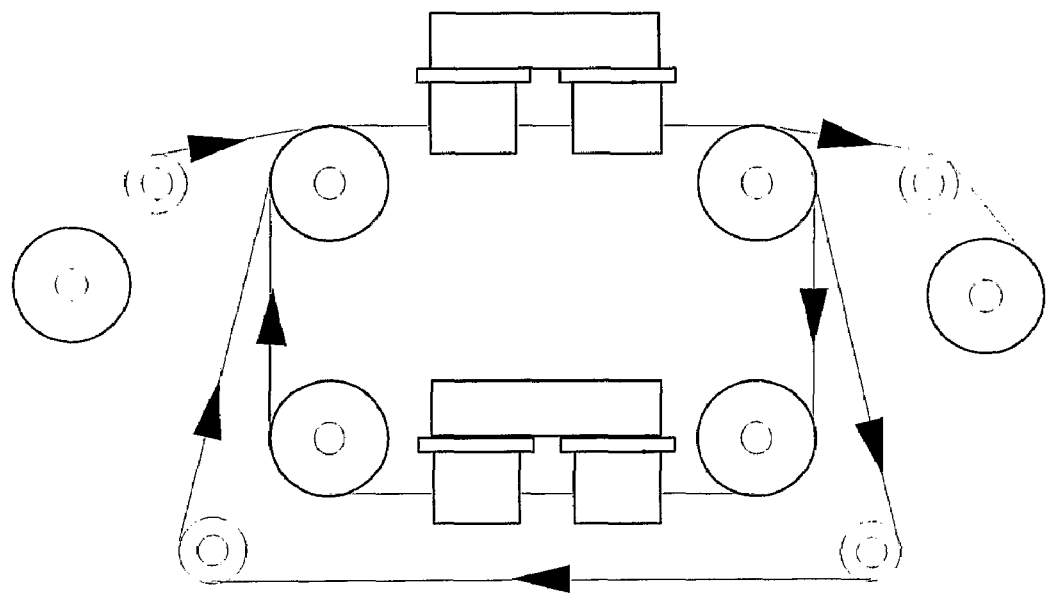
FIGS. 5, 6 and 7 are a diagrammatic front elevation, plan and orthogonal view respectively of an apparatus according to the invention.
Figure 6:
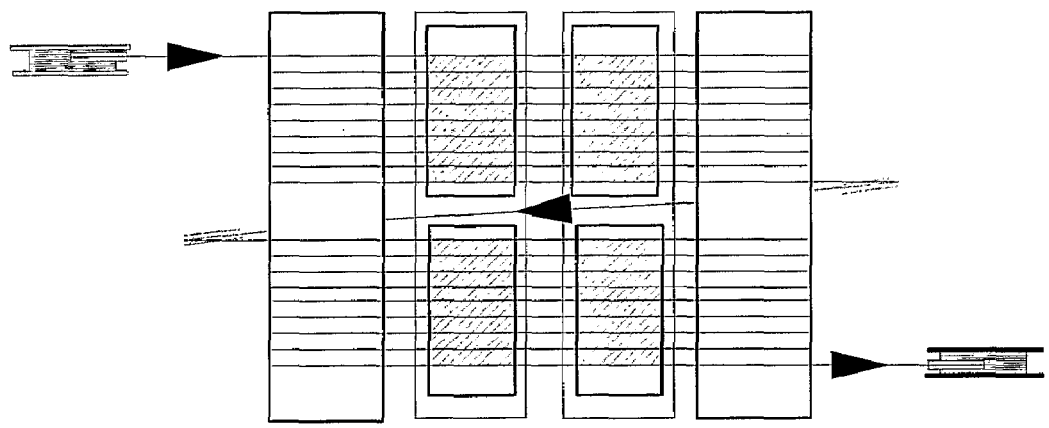
Figure 7:
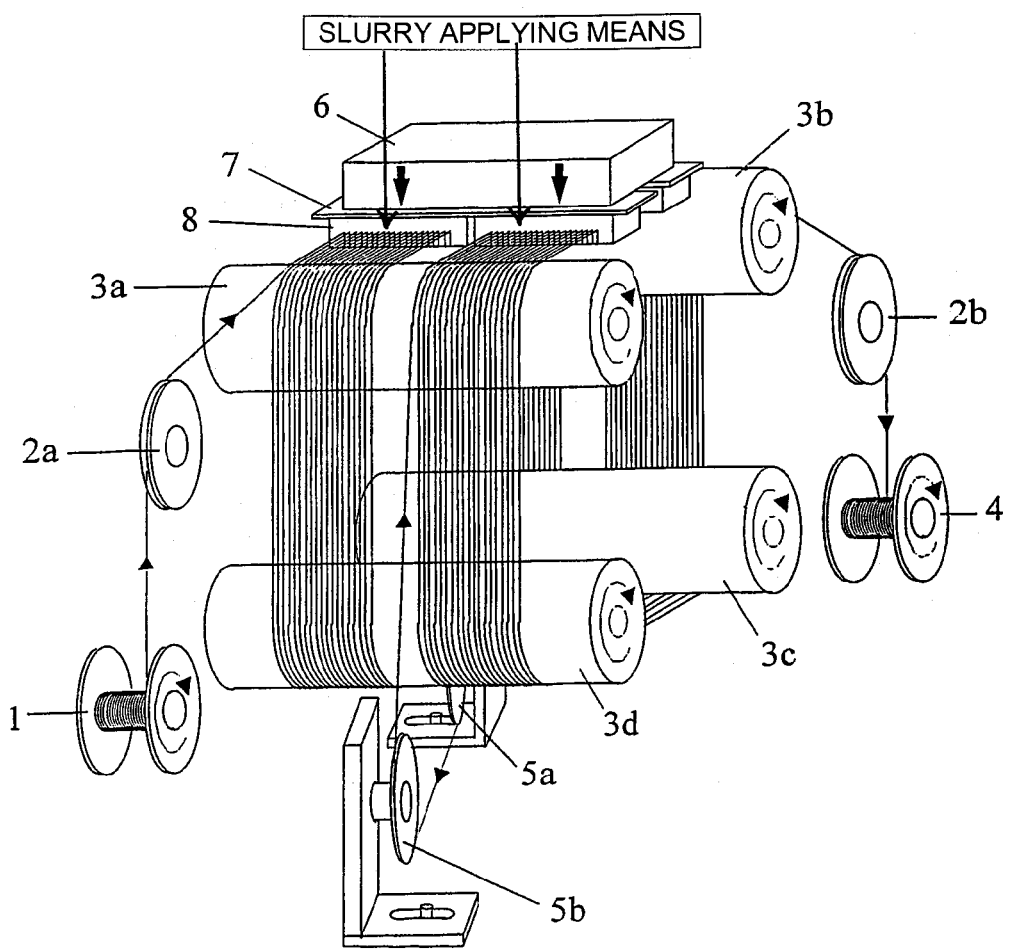

A specific form of apparatus following the invention is shown in FIGS. 5, 6 and 7. A motor driven supply reel 1 carries a high tensile steel wire of 100 to 200 (and preferably 150 to 180) microns diameter and up to 450 kilometers long. The wire is led over a tensioning pulley 2a, and then over four motor driven grooved roller guides 3a to 3d at a very shallow pitch. Roller guides 3a and 3b form an upper pair, and roller guides 3c and 3d form a lower pair. The axes of the roller guides are arranged in a rectangle (when viewed end on to the axes), so that the wire is disposed in a web having upper and lower cutting planes. After passing around the roller guides, the wire is passed over a further tensioning pulley 2b, and is then taken up on a motor driven collection reel 4. The wire is driven at speeds of up to 10 meters a second, and the arrangement is flooded with a constant supply of slurry consisting of an abrasive powder such as 10 micron silicon carbide powder in a lubricating and cooling medium such as paraffin oil or polyethylene glycol.

As with the example of prior art, four blocks of silicon 8 are disposed to be cut in the upper cutting plane, and four more blocks are arranged to be cut in the lower cutting plane. Each pair of blocks of silicon is glued to a glass or ceramic mounting plate 7. The mounting plates are attached to a motor driven vertical translation mechanism 6. In some circumstances, two blocks may be co-joined end to end.

However, in this case, (in contrast with the prior art) the upper and lower cutting webs are split by diverting the wire away from the cutting planes between the blocks as it passes from the upper to the lower pair of roller guides. The wire is diverted by a pair of bracket mounted idler pulleys 5a and 5b to leave the roller guide 3b, to run beneath the roller guides 3c and 3d, and to rejoin roller guide 3a at a position spaced laterally apart from the position at which it was diverted. The diversion of the wire forms a gap in the web at the upper and lower cutting planes corresponding to the space between the blocks 8. Thus the end portions of the blocks 8 are not cut. These end portions act as stabilising support abutments for the wafers during sawing and subsequent removal and washing procedures, and may be removed for cleaning and re-casting into ingots.

The arrangement of FIGS. 5, 6 and 7 allows the multiwire slurry sawing technique to be used with improved efficiency for cutting multicrystalline silicon blocks which are themselves shorter than the full machine web width.

Whereas the example of the invention described above refers to the use of high tensile steel wire, a further modification of the invention involves the use of non-metallic wires based upon high strength long chain organic polymers. A specific, but non exclusive, example is the polyaromatic amide manufactured commercially under the trade name Kevlar™.

This material is available in both monofilament and woven forms. It has a tensile strength five times greater than steel. These features allow the use of thinner diameter wires, which give a greater yield of wafers from the same size of block. It also eliminates contamination of the used slurry with iron, copper and zinc particles that frustrate the recovery of valuable silicon dust from the slurry.

ADVANTAGES OF THE INVENTION

When cutting silicon wafers for the PV industry it is possible to mount pairs of blocks which are of the full ingot height, and to cut full sections of high quality material from each without the web passing outside the ends of the material.

The split web ensures that blocks are only wafered within a specified section of predetermined quality material.

The split web ensures that the whole of the web experiences a uniform cutting load thus preventing uneven wire tensions which produce wafer thickness variations and saw marks.

The unwafered end pieces of each block can be recycled in their entirety.

The unwafered end pieces act as stabilising end pieces for the wafers during cleaning procedures following sawing.

Variations in wafer thickness and the number of saw marked wafers are reduced.

The number of wafer breakages during sawing and cleaning is reduced.

Wire breakages and damage to the roller guides from broken wafers (and the need for re-grooving) are greatly reduced and overall yield significantly improved.

Sawing yield is improved when using multi-wire abrasive sawing technology to cut any single or multicrystalline bulk material where more than one segment of material is placed across any transverse section of the web.

The invention claimed is:

1. An apparatus for cutting a multiplicity of thin wafers from at least two similar blocks, the apparatus comprising a supply reel to supply cutting wire, an upper pair of parallel spaced roller guides having a multiplicity of circumferential grooves on surfaces thereof, a lower pair of parallel spaced roller guides having a multiplicity of circumferential grooves on surfaces thereof that are similar to the multiplicity of circumferential grooves on surfaces of the upper pair of parallel spaced roller guides and spaced apart from the upper pair of roller guides in a plane generally parallel to and spaced apart from a plane defined by the axes of the upper pair of roller guides, a collection reel, means for driving the cutting wire rapidly from the supply reel to the collection reel, wherein the cutting wire from the supply reel is arranged to pass around successive grooves along the roller guides from near the supply reel to near the collection reel to from a four sided continuous web of cutting wire along the length of the roller guides, and means for moving the blocks through the web of cutting wire between the pairs of roller guides in a direction generally perpendicular to the axes of the roller guides, so that the blocks are cut into wafers by the action of the moving cutting wire, wherein part way along the roller guides, the cutting wire is diverted around at least two pulley wheels to remove the cutting wire from the web after it has passed over a roller guide at a predetermined point, and to reintroduce the cutting wire into the web via a subsequent roller guide at a point laterally displaced from the point at which the cutting wire left the web, so that there is a gap in the web of cutting wire which divides the web into two separate sections, and no cutting action can occur in that gap.

2. The apparatus as claimed in claim 1, in which the predetermined point at which the cutting wire is removed from the roller guides is variable in a direction lengthwise of the roller guides.

3. The apparatus as claimed in claim 1 or claim 2, including means to adjust a distance at which the cutting wire is laterally displaced before reintroducing the cutting wire into the web.

4. The apparatus as claimed in claim 1 or 2, in which at least one of the at least two pulley wheels to remove the cutting wire from the web is an idler wheel.

5. The apparatus as claimed in claim 1 or 2, in which the at least two pulley wheels to remove the cutting wire from the web are located mid way along a length of the roller guides.

6. The apparatus as claimed in claim 1 or 2, in which a width of each separate section of the web is smaller than the block to be cut, so as to leave an uncut supporting abutment at at least one end of each block on completion of the cutting action.

7. The apparatus as claimed in claim 1, in which the cutting wire is of coated high tensile steel.

8. The apparatus as claimed in 7, including means for applying a slurry to the blocks.

9. The apparatus as claimed in claim 1, in which the cutting wire is of high strength long chain organic polymers.

10. A method of cutting a multiplicity of thin wafers from at least two similar blocks comprising the steps of passing a cutting wire around two pairs of roller guides having a multiplicity of circumferential grooves on surfaces thereof that are arranged to form upper and lower cutting planes, driving the cutting wire around a foursided continuous web of cutting wire along a length of the roller guides, moving the blocks through the web of cutting wire in a direction generally perpendicular to axes of the roller guides, diverting the cutting wire around at least two pulley wheels to remove the cutting wire from the web after it has passed over one roller guide at a predetermined point, and reintroducing the cutting wire to the web via a subsequent roller guide at a point laterally displaced from the point at which the cutting wire left the web, so that there is a gap in the web of cutting wire which divides the web into two separate sections, and no cutting action occurs in that gap.

* * * * *